United States Patent
Bao et al.

(10) Patent No.: US 10,250,326 B2
(45) Date of Patent: Apr. 2, 2019

(54) EMBEDDED APPARATUS TO MONITOR SIMULATED BRILLOUIN SCATTERING FROM RAMAN AMPLIFIER IN FIBER OPTICS TRANSMISSION SYSTEM

(71) Applicant: Ciena Corporation, Hanover, MD (US)

(72) Inventors: Jun Bao, Ellicott City, MD (US); Joseph F. Ferment, III, Sykesville, MD (US); Hua Jiao, Ellicott City, MD (US); Jean-Luc Archambault, Severna Park, MD (US)

(73) Assignee: Ciena Corporation, Hanover, MD (US)

( * ) Notice: Subject to any disclaimer, the term of this patent is extended or adjusted under 35 U.S.C. 154(b) by 346 days.

(21) Appl. No.: 13/902,210

(22) Filed: May 24, 2013

(65) Prior Publication Data
US 2014/0348501 A1    Nov. 27, 2014

(51) Int. Cl.
*H04B 10/079*    (2013.01)
(52) U.S. Cl.
CPC .................. *H04B 10/0797* (2013.01)
(58) Field of Classification Search
CPC ................................. H04B 10/0797
USPC ..................... 398/29, 33; 359/334
See application file for complete search history.

(56) References Cited

U.S. PATENT DOCUMENTS

| | | | |
|---|---|---|---|
| 6,292,288 B1 * | 9/2001 | Akasaka | H01S 3/06754 359/334 |
| 6,305,851 B1 * | 10/2001 | Stummer | H04B 10/071 385/24 |
| 6,466,362 B1 | 10/2002 | Friedrich | |
| 6,525,870 B1 | 2/2003 | Cho et al. | |
| 6,547,453 B1 * | 4/2003 | Stummer | H04B 10/071 385/24 |

(Continued)

OTHER PUBLICATIONS

Busi & Allan, "Operations, Administration, and Maintenance Framework for MPLS-Based Transport Networks," Internet Engineering Task Force (IETF), Request for Comments: 6371, Category: Informational, ISSN: 2070-1721, Sep. 2011, http://tools.ietf.org/pdf/rfc6371.pdf, pp. 1-62.

(Continued)

*Primary Examiner* — Amritbir K Sandhu
(74) *Attorney, Agent, or Firm* — Clements Bernard Walker PLLC; Christopher L. Bernard; Lawrence A. Baratta, Jr.

(57) ABSTRACT

The embedded apparatus disclosed herein may measure reflection coefficient values associated with back reflections in a fiber optics transmission system during a variable detection window to detect normal conditions, simulated Brillouin scattering (SBS), or excessive back reflections triggering remedial action. For example, the back reflections may indicate normal conditions if the reflection coefficients measured during an entire detection window remained below a threshold or a maximum reflection coefficient observed therein was below the threshold. Alternatively, the back reflections may trigger remedial action if the reflection coefficients measured in the entire detection window exceeded the threshold or a minimum reflection coefficient observed therein was above the threshold. Otherwise, the back reflections may indicate the SBS effect if the reflection coefficients measured during the detection window included points above and below the threshold or the minimum and maximum reflection coefficients observed therein were below and above the threshold.

20 Claims, 6 Drawing Sheets

(56) References Cited

U.S. PATENT DOCUMENTS

| | | | | |
|---|---|---|---|---|
| 7,283,216 | B1* | 10/2007 | Geng | G01B 11/18 |
| | | | | 356/35.5 |
| 7,796,270 | B2* | 9/2010 | Yelin | A61B 5/0066 |
| | | | | 356/456 |
| 7,899,334 | B2 | 3/2011 | Zhong et al. | |
| 8,170,417 | B2* | 5/2012 | Liu | H04J 14/0204 |
| | | | | 398/33 |
| 8,620,155 | B2* | 12/2013 | Eggleton | H04B 10/071 |
| | | | | 398/26 |
| 2002/0171917 | A1* | 11/2002 | Lelic | H04B 10/077 |
| | | | | 359/341.4 |
| 2004/0242689 | A1* | 12/2004 | Parks | A61K 31/203 |
| | | | | 514/559 |
| 2005/0099674 | A1* | 5/2005 | Watanabe | G02F 1/3538 |
| | | | | 359/330 |
| 2005/0105165 | A1* | 5/2005 | Emori | H01S 3/06754 |
| | | | | 359/334 |
| 2007/0242689 | A1* | 10/2007 | Zavadsky | H04L 1/24 |
| | | | | 370/464 |
| 2008/0292312 | A1* | 11/2008 | Oron | H04B 10/0795 |
| | | | | 398/33 |
| 2009/0237779 | A1* | 9/2009 | Suzuki et al. | 359/334 |
| 2010/0178052 | A1* | 7/2010 | Eggleton | H04B 10/071 |
| | | | | 398/26 |
| 2012/0013975 | A1* | 1/2012 | Onaka | 359/334 |
| 2012/0074982 | A1* | 3/2012 | Rebaud et al. | 326/21 |
| 2012/0170929 | A1* | 7/2012 | Xie | H04B 10/0793 |
| | | | | 398/33 |
| 2013/0163620 | A1* | 6/2013 | Lecoeuche | H04B 10/077 |
| | | | | 372/20 |

OTHER PUBLICATIONS

Swallow et al., "MPLS Fault Management Operations, Administration, and Maintenance (CAM)," Internet Engineering Task Force (IETF), Request for Comments: 6427, Category: Standards Track, ISSN: 2070-1721, Nov. 2011, http://tools.ietf.org/pdf/rfc6427.pdf, pp. 1-17.

* cited by examiner

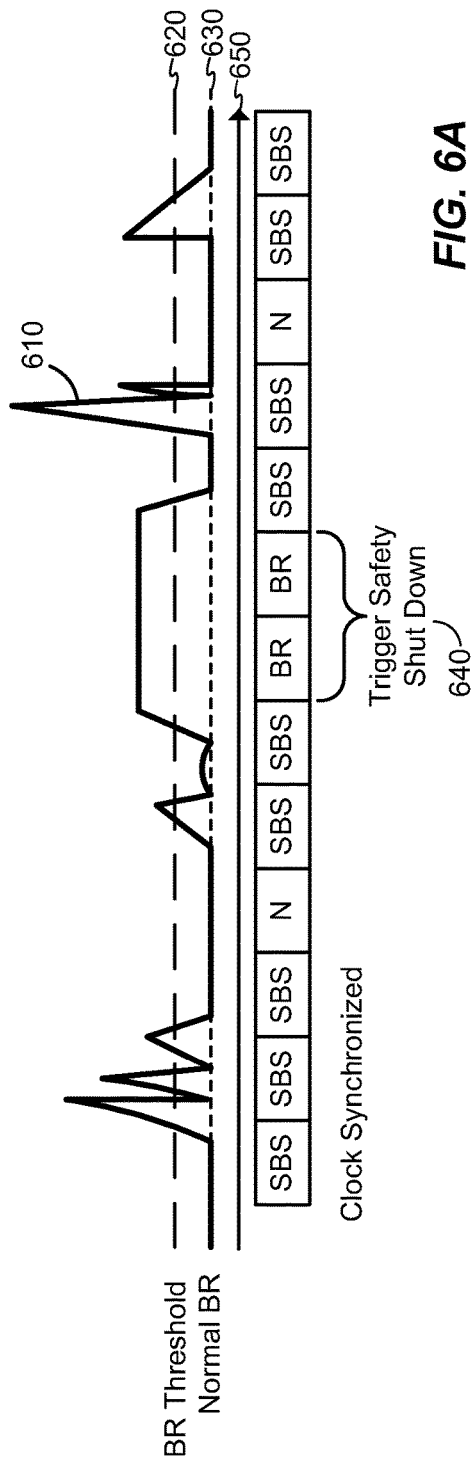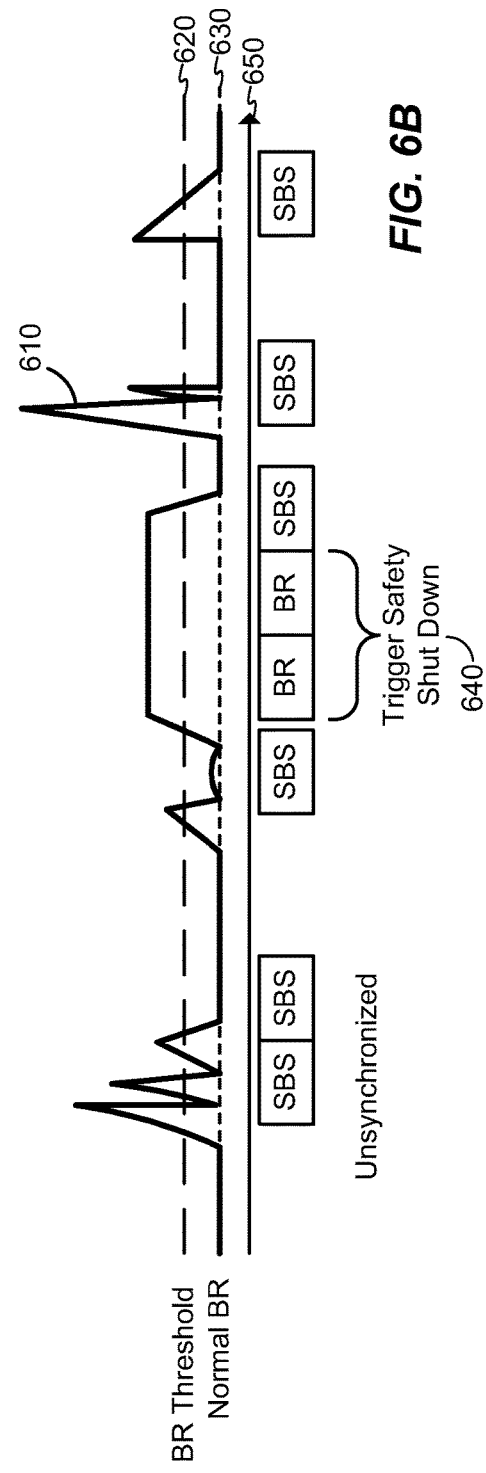

EMBEDDED APPARATUS TO MONITOR SIMULATED BRILLOUIN SCATTERING FROM RAMAN AMPLIFIER IN FIBER OPTICS TRANSMISSION SYSTEM

FIELD OF DISCLOSURE

The present application generally relates to an embedded apparatus that may monitor simulated Brillouin scattering (SBS) from a Raman amplifier in a fiber optics transmission system, and in particular, to a monitoring circuit that can shut down the Raman amplifier in response to excessive back reflection and monitor the SBS to determine potential impact on performance associated with the Raman amplifier in a manner that may avoid a false safety shut down.

BACKGROUND

Optical communication systems have replaced other communication mediums due to many advantages associated therewith. For example, optical communication systems typically have wide bandwidth and low attenuation, immunity to electrical noise, and the ability to securely transmit signals over long distances. However, despite the low attenuation that optical communication systems may offer, the optical signals transmitted therein nevertheless require amplification. Although many optical amplifiers currently exist, the most widely used amplifiers are lumped or discrete amplifiers that typically include an optical fiber doped with an optically active material (e.g., Erbium or other rare earth elements). Generally, the core region within the optical fiber contains the dopant, which is optically excited to provide optical gain to an optical signal (e.g., an optical pump signal) having a suitable wavelength. For example, an Erbium-doped fiber amplifier amplifies optical signals that typically have wavelengths in a range between 1520 nanometers (nm) to 1580 nm when pumped by an optical pump signal having a 980 nm or 1480 nm wavelength. Other optical amplifiers that are widely used in optical systems include distributed amplifiers, which typically amplify a signal over a relatively long distributed fiber segment (e.g., a 20 kilometer fiber segment). For example, distributed amplifiers may be based on stimulated Raman scattering or stimulated Brillouin scattering (SBS).

In general, SBS refers to a third-order non-linear optical effect that occurs when an intense beam travelling in a medium (e.g., laser light travelling in an optical fiber) may undergo scattering in a reverse direction from the incoming beam due to variations in the electric field associated with the beam that may produce acoustic vibrations in the medium via electrostriction. The SBS effect tends to be a common phenomenon with a narrow linewidth distributed feedback (DFB) laser. Furthermore, Raman pumps that have many longitudinal modes often exhibit the SBS effect at low power due to modal instability. For Raman amplifiers, the SBS effect tends to be undesirable because the scattering that occurs may change the frequency, path, or other characteristics associated with the beam. Furthermore, when the SBS effect occurs, which has been observed at Raman pump power levels as high as 140 milliwatts (mW), light scattered in the reverse direction from the Raman pump may generate noise propagating in the same direction with the signal in systems that use counter Raman pump schemes.

Raman amplifiers currently tend to rely on a back reflection monitoring circuit to detect back reflection that may require a safety shut down to prevent irreparable damage, hazardous conditions or health risks due to pumping light potentially escaping the optical system, and comply with governmental safety standards. However, because the SBS effect usually exists at lower powers and has a narrow linewidth, the reflection tends to be very high (even higher than at normal reflection at higher Raman power levels), which may force the Raman amplifier to increase a back reflection threshold to avoid possible false Raman safety shutdowns. For example, at one extreme, the SBS effect may cause back reflections that are still above the relevant threshold, which may result in a false Raman pump safety shut down, while at the other extreme, increasing the threshold to prevent a false safety shut down could pose a health risk because imperfect conditions may not be detected and violate applicable laser safety ratings (e.g., standards that define conditions under which a Hazard Level 1M laser may be considered safe). Although pump dithering could potentially be used to broaden the laser linewidth in order to suppress the SBS effect, pump dithering typically will not completely eliminate the SBS effect, and moreover, suitably monitoring SBS events in the optical system may still be desirable even if the SBS effect can be substantially suppressed because the SBS effect can result in scattered light having a substantial impact on gain, noise, bit error rate (BER) hits, and other factors that relate to system performance.

SUMMARY

The following presents a simplified summary relating to various embodiments relating to the embedded apparatus disclosed herein that may monitor simulated Brillouin scattering (SBS) from a Raman amplifier in a fiber optics transmission system in order to provide a basic understanding relating to such embodiments. As such, the following summary should not be considered an extensive overview of all contemplated embodiments, nor is the following summary intended to identify key or critical elements of all embodiments described herein or delineate the scope of any particular embodiment. Accordingly, the sole purpose of the following summary is to present certain concepts relating to one or more embodiments relating to the embedded apparatus that may monitor SBS from a Raman amplifier disclosed herein in a simplified form as a prelude to the more detailed description presented below.

According to various embodiments, back reflection that occurs in a fiber optics transmission system may be monitored within a variable detection window to determine whether the back reflection indicates normal conditions, an SBS effect that may correlate to health or performance associated with the fiber optics transmission system, or a back reflection issue that may require a safety shut down or other remedial action to prevent damage to the fiber optics transmission system or hazardous conditions that may result from pumping energy escaping the fiber optics transmission system. More particularly, a monitoring circuit may monitor back reflections associated with a signal transmitted from a Raman pump to a Raman amplifier while the Raman pump gradually powers up and during any subsequent steady state operation to determine a status associated with the fiber optics transmission system. For example, the monitoring circuit may determine a reflection coefficient associated with the back reflected signal (e.g., a percentage of the transmitted signal that is reflected) and determine that back reflections during a certain variable detection window indicate normal conditions if the back reflected signal always had a reflection coefficient below a defined threshold during the detection window or had a maximum reflection coefficient below the threshold during the detection window. Alternatively, the monitoring circuit may determine that the back reflections during the detection window indicate a back reflection issue that may trigger a safety shut down or maintenance on the fiber optics transmission system if the back reflected signal always had a reflection coefficient above the threshold during the detection window or had a minimum reflection coefficient above the threshold during the detection window. Otherwise, if the back reflected signal had at least one reflection coefficient point above the threshold and at least one reflection coefficient point below the threshold during the detection window (or the minimum reflection coefficient was below the threshold and the maximum reflection coefficient was above the threshold) during the detection window, the monitoring circuit may attribute the back reflections during the detection window to the SBS effect, in which case the monitoring circuit may record an SBS event that includes a time stamp to indicate the detection window during which the SBS effect was observed and increment an SBS counter that tracks how many SBS events were observed over time.

According to one embodiment, an apparatus to monitor pump stability in a fiber optics transmission system may comprise, among other things, an optical pump source configured to transmit a signal in the fiber optics transmission system, an optical amplifier configured to receive and amplify the signal, and a monitoring circuit configured to compare reflection coefficients associated with one or more back reflections from the fiber optics transmission system during a detection window to a threshold, wherein the detection window may comprise a variable detection window having a duration that decreases with increases in a power level at which the optical pump source transmits the signal. Accordingly, the monitoring circuit may compare the reflection coefficients associated with the back reflections that were observed in the detection window to determine whether the back reflections that are observed during the detection window indicate an SBS event, a normal condition, or excessive back reflections that trigger at least one remedial action. For example, in one embodiment, the monitoring circuit may determine that the back reflections observed during the detection window indicate the normal condition if the reflection coefficients associated therewith remained below the threshold during the entire detection window or the reflection coefficients in the detection window had a maximum value below the threshold. Alternatively, the monitoring circuit may determine that the back reflections observed during the detection window indicate the excessive back reflections, which may trigger the remedial action (e.g., a safety shut down), if the reflection coefficients associated therewith exceeded the threshold during the entire detection window or the reflection coefficients in the detection window had a minimum value above the threshold. Otherwise, the monitoring circuit may determine that the back reflections observed during the detection window indicate the SBS event if the reflection coefficients associated therewith included at least one value above the threshold and at least one value below the threshold or the reflection coefficients in the detection window had a maximum value above the threshold and a minimum value below the threshold. In one embodiment, if the monitoring circuit determines that the back reflections observed during the detection window indicate the SBS event, the monitoring circuit may further increment an SBS counter that tracks how many SBS events have been observed in the fiber optics transmission system and record a time stamp associated with the indicated SBS event, wherein the SBS counter and the time stamp can be stored and correlated with metrics that indicate health or performance associated with at least one component in the fiber optics transmission system. Furthermore, in one embodiment, the detection window may be synchronized to a clock, or the detection window may alternatively (or additionally) be started in response to the monitoring circuit detecting at least one back reflection having a reflection coefficient above the threshold.

According to one embodiment, a method to monitor pump stability in a fiber optics transmission system may comprise, among other things, operating an optical pump source to transmit a signal in the fiber optics transmission system, wherein an optical amplifier may receive and amplify the transmitted signal. The method may further comprise measuring, at a monitoring circuit, reflection coefficients associated with one or more back reflections from the fiber optics transmission system during a detection window and comparing, at the monitoring circuit, the measured reflection coefficients associated with the back reflections observed during the detection window to a threshold to determine whether the back reflections that are observed during the detection window indicate an SBS event, a normal condition, or excessive back reflections that trigger at least one remedial action. For example, in one embodiment, comparing the measured reflection coefficients associated with the back reflections to the threshold may comprise determining that the back reflections observed during the detection window indicate the normal condition if the reflection coefficients associated therewith remained below the threshold during the entire detection window or the reflection coefficients in the detection window had a maximum value below the threshold. Alternatively, the comparison may result in a determination that the back reflections during the detection window indicate the excessive back reflections triggering the remedial action if the reflection coefficients associated therewith exceeded the threshold during the entire detection window or the reflection coefficients in the detection window had a minimum value above the threshold. Otherwise, the comparison may result in a determination that the back reflections during the detection window indicate the SBS event if the reflection coefficients associated therewith included at least one value above the threshold and at least one value below the threshold or the reflection coefficients in the detection window had a maximum value above the threshold and a minimum value below the threshold. In one embodiment, if the back reflections are determined to indicate the SBS event, the method may further comprise incrementing an SBS counter that tracks how many SBS events have been observed in the fiber optics transmission system and recording a time stamp associated with the indicated SBS event, wherein the SBS counter and the time stamp can be stored and correlated with metrics that indicate health or performance associated with at least one component in the fiber optics transmission system.

According to one embodiment, a computer-readable storage medium may have computer-executable instructions to monitor pump stability in a fiber optics transmission system recorded thereon, wherein executing the computer-executable instructions on an appropriate device (e.g., a processor, computer, circuitry, apparatus, etc.) may cause the device to operate an optical pump source to transmit a signal to an optical amplifier in the fiber optics transmission system, wherein the optical amplifier may receive and amplify the transmitted signal. Additionally, executing the computer-executable instructions on the device may further cause the device to measure reflection coefficients associated with one or more back reflections from the fiber optics transmission system during a detection window and compare the measured reflection coefficients to a threshold in order to determine whether the back reflections observed during the detection window indicate an SBS event, a normal condition, or excessive back reflections that trigger at least one remedial action. For example, in one embodiment, the computer-executable instructions may cause the device to determine that the back reflections observed during the detection window indicate the normal condition if the reflection coefficients associated therewith remained below the threshold during the entire detection window or the reflection coefficients in the detection window had a maximum value below the threshold. Alternatively, the computer-executable instructions may cause the device to determine that the back reflections during the detection window indicate the excessive back reflections triggering the remedial action if the reflection coefficients associated therewith exceeded the threshold during the entire detection window or the reflection coefficients in the detection window had a minimum value above the threshold. Otherwise, the computer-executable instructions may cause the device to determine that the back reflections during the detection window indicate the SBS event if the reflection coefficients associated therewith included at least one value above the threshold and at least one value below the threshold or the reflection coefficients in the detection window had a maximum value above the threshold and a minimum value below the threshold. In one embodiment, if the back reflections are determined to indicate the SBS event, the computer-executable instructions may further cause the device to increment an SBS counter that tracks how many SBS events have been observed in the fiber optics transmission system and record a time stamp associated with the indicated SBS event, thereby deriving information that can be stored and correlated with metrics that indicate health or performance associated with the fiber optics transmission system.

Other objects and advantages associated with the embodiments relating to the embedded apparatus disclosed herein that may monitor SBS from a Raman amplifier to determine pump stability in a fiber optics transmission system will be apparent to those skilled in the art based on the accompanying drawings and detailed description.

BRIEF DESCRIPTION OF THE DRAWINGS

The accompanying drawings are presented to aid in the description of the embodiments disclosed herein and are provided solely to illustrate exemplary features associated with the disclosed embodiments without defining any limitations thereof.

FIGS. 6A-B illustrate exemplary synchronized and unsynchronized timing diagrams that show possible SBS events detected based on back reflection from a monitored Raman amplifier, according to one exemplary embodiment.

DETAILED DESCRIPTION

Figure 1:
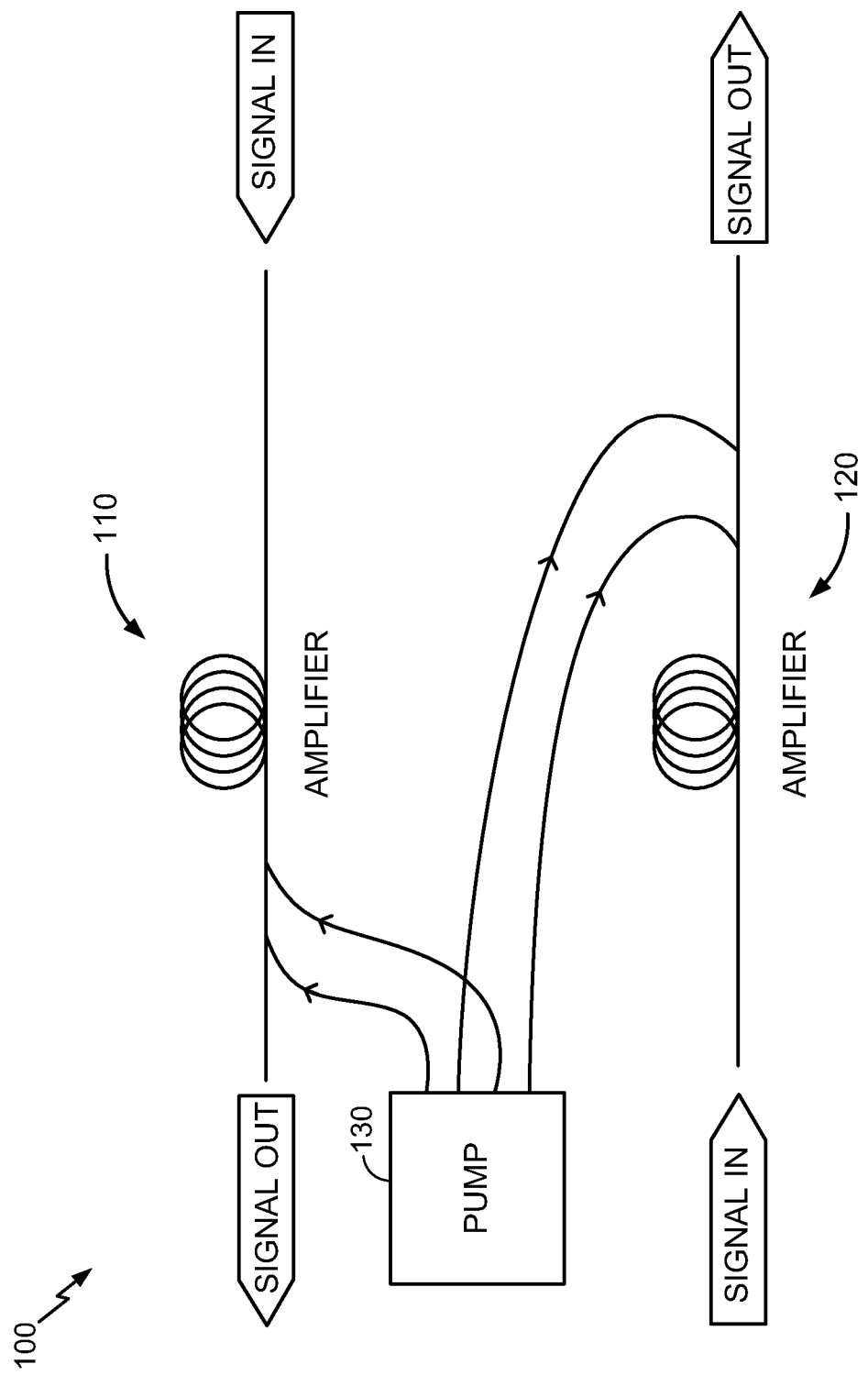
FIG. 1 illustrates an exemplary apparatus that may monitor simulated Brillouin scattering (SBS) based on a back reflected signal from a Raman amplifier in a fiber optics transmission system, according to one exemplary embodiment.

Aspects are disclosed in the following description and related drawings to show specific examples relating to various exemplary embodiments relating to an embedded apparatus that may monitor simulated Brillouin scattering (SBS) from a Raman amplifier in a fiber optics transmission system. However, alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

According to various embodiments, back reflection that occurs in a fiber optics transmission system may be monitored within a variable detection window to determine whether the back reflection indicates normal conditions, an SBS effect that may correlate to health or performance associated with the fiber optics transmission system, or a back reflection issue that may require a safety shut down or other remedial action to prevent damage to the fiber optics transmission system or hazardous conditions that may result from pumping energy escaping the fiber optics transmission system. More particularly, a monitoring circuit may monitor back reflections associated with a signal transmitted from a Raman pump to a Raman amplifier while the Raman pump gradually powers up and during any subsequent steady state operation to determine a status associated with the fiber optics transmission system. For example, the monitoring circuit may determine a reflection coefficient associated with the back reflected signal (e.g., a percentage of the transmitted signal that is reflected) and determine that back reflections during a certain variable detection window indicate normal conditions if the back reflected signal always had a reflection coefficient below a defined threshold during the detection window or had a maximum reflection coefficient below the threshold during the detection window. Alternatively, the monitoring circuit may determine that the back reflections during the detection window indicate a back reflection issue that may trigger a safety shut down or maintenance on the fiber optics transmission system if the back reflected signal always had a reflection coefficient above the threshold during the detection window or had a minimum reflection coefficient above the threshold during the detection window. Otherwise, if the back reflected signal had at least one reflection coefficient point above the threshold and at least one reflection coefficient point below the threshold during the detection window (or the minimum reflection coefficient was below the threshold and the maximum reflection coefficient was above the threshold) during the detection window, the monitoring circuit may attribute the back reflections during the detection window to the SBS effect, in which case the monitoring circuit may record an SBS event that includes a time stamp to indicate the detection window during which the SBS effect was observed and increment an SBS counter that tracks how many SBS events were observed over time.

More particularly, according to one exemplary embodiment, FIG. 1 illustrates an exemplary apparatus 100 that may be used to monitor SBS based on back reflections from a suitable amplifier (e.g., a Raman amplifier) in a fiber optics transmission system. As shown in FIG. 1, the apparatus 100 may generally include, among other things, a first amplifier 110, a second amplifier 120, and a pump 130. In one embodiment, the first amplifier 110 and the second amplifier 120 may comprise Raman amplifiers or other suitable distributed amplifiers and the pump 130 may comprise a Raman pump. However, those skilled in the art will appreciate that the first amplifier 110 and/or the second amplifier 120 may alternatively comprise discrete amplifiers that include a fiber section doped with an optically active material (e.g., Erbium) and amplify signals travelling along the doped fiber section with a wavelength around approximately 1550 nanometers (nm). In one embodiment, the first amplifier 110 may generally amplify signals travelling in one direction and the second amplifier 120 may generally amplify signals travelling in an opposite direction from the first amplifier.

Figure 2:
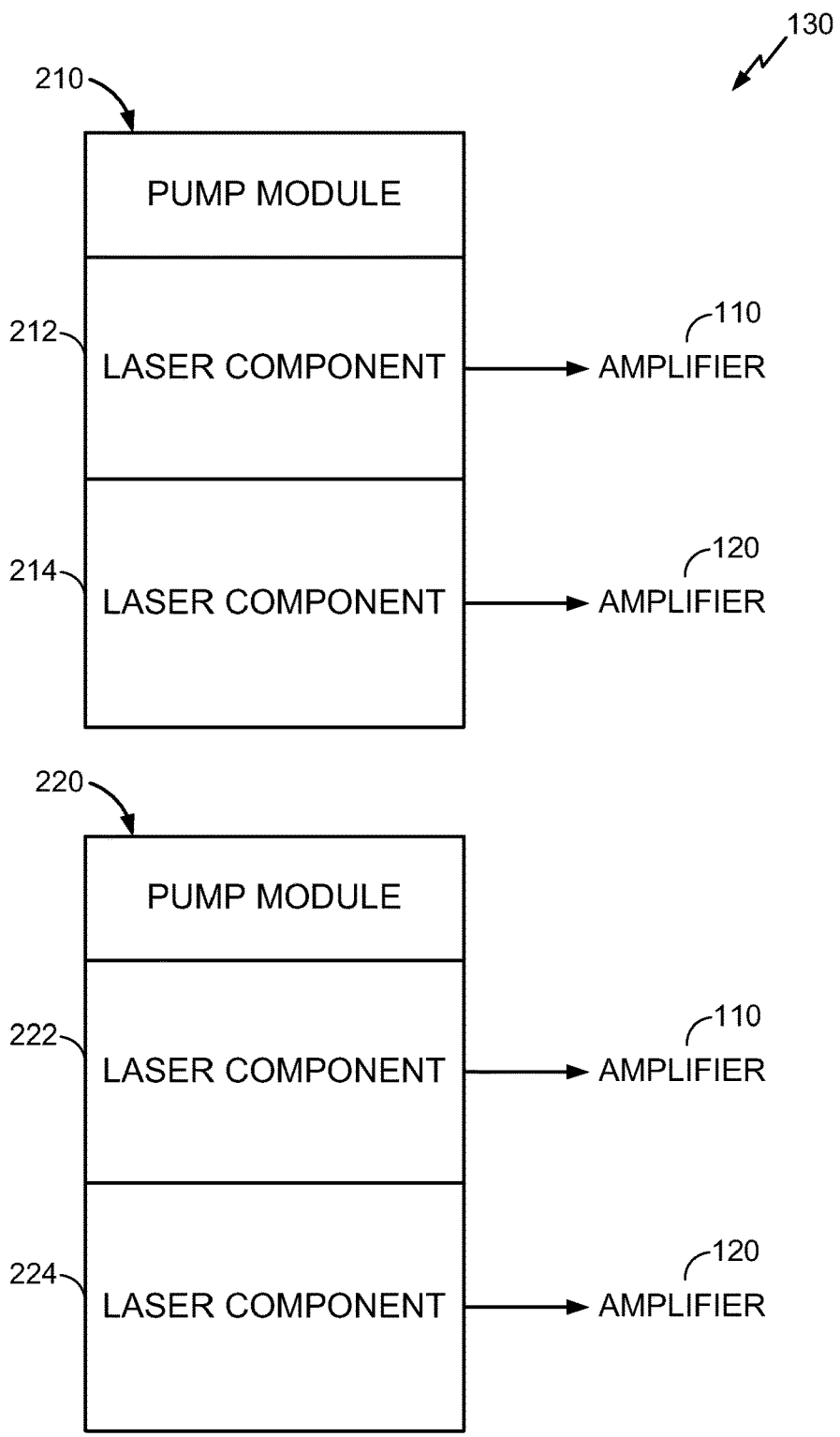
FIG. 2 illustrates an exemplary Raman pump that may supply power to a Raman amplifier that may exhibit the SBS effect in a fiber optics transmission system, according to one exemplary embodiment.

In one embodiment, the pump 130 may generally comprise a Raman pump configured to supply power to the first amplifier 110 and the second amplifier 120, which may exhibit the SBS effect in the fiber optics transmission system. According to one exemplary embodiment, FIG. 2 illustrates further detail relating to the Raman pump 130 that may supply power to the first amplifier 110 and the second amplifier 120 that may exhibit the SBS effect. As shown therein, the Raman pump 130 may include a first pump module 210 having two laser components 212 and 214 respectively configured to emit laser light to the first amplifier 110 and the second amplifier 120. For example, in one embodiment, the two laser components 212 and 214 may each have different wavelengths to produce gain for a counter-propagating signal in different portions of the signal band and thereby produce flat gain across the signal band. Furthermore, the Raman pump 130 may include a second pump module 220 that having two laser components 222 and 224 respectively configured to emit laser light to the first amplifier 110 and the second amplifier 120 in a substantially similar manner to the first pump module 210. However, those skilled in the art will appreciate that the Raman pump 130 may alternatively include one pump module or more than two pump modules, and further that the first pump module 210 and/or the second pump module 220 may alternatively include one laser component, a redundant laser component design, or more than two laser components (e.g., depending on how many amplifiers the apparatus 100 shown in FIG. 1 includes).

Figure 3:
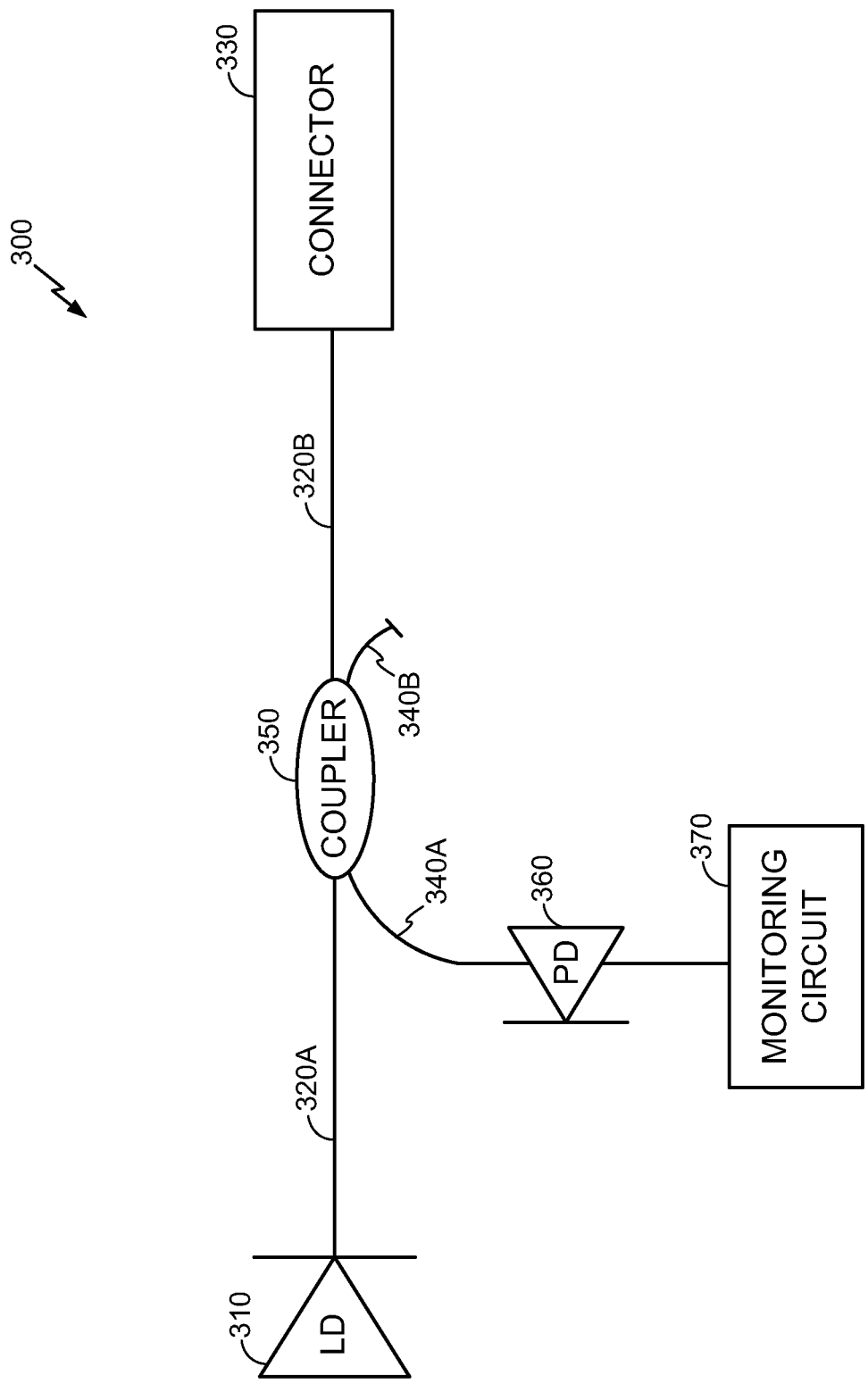
FIG. 3 illustrates an exemplary laser component that may include a monitoring circuit that can monitor SBS based on a back reflected signal from a Raman amplifier in a fiber optics transmission system, according to one exemplary embodiment.

According to one exemplary embodiment, FIG. 3 illustrates an exemplary laser component 300 that may correspond to laser components 212, 214, 222, and/or 224 shown in FIG. 2, wherein the laser component 300 shown in FIG. 3 may include a monitoring circuit 370 that can monitor SBS based on back reflections from a Raman amplifier (e.g., the first amplifier 110 and/or the second amplifier 120). Furthermore, in addition to the monitoring circuit 370, the laser component 300 shown in FIG. 3 may include a laser 310 (e.g., a laser diode), a pump fiber having a first section 320A and a second section 320B connected to one another through a coupler 350 (e.g., a circulator or other suitable optical transfer device), a connector 330, a back reflection fiber having a first section 340A and a second section 340B, and a detector 360 (e.g., a photodiode detector). In one embodiment, the laser 310 may typically include a conventional semiconductor laser that can emit light in a continuous wave (CW) mode at a wavelength in a range between approximately 1420-1470 nm. Moreover, the laser 310 may emit the light at a power level in a range between approximately 100-500 milliwatts (mW). However, those skilled in the art will appreciate that the laser 310 may emit the light at another suitable power level and/or another suitable wavelength. In one embodiment, the pump fiber 320A-320B may comprise an optical fiber that connects the laser 310 to the connector 330 (e.g., an E2000 style connector). For example, in one embodiment, the connector 330 may provide a straight connection between two fiber ends that have a straight cut, or the connector 330 may alternatively provide an angled connection between two fiber ends that have an angled cut (e.g., a seven degree cut). In general, straight-cut connections may cause more reflection than angled-cut connections.

In one embodiment, the back reflection fiber may include an optical reflection fiber 340A with one end connected to the coupler 350 and the other end connected to the detector 360 and the monitoring circuit 370. Furthermore, the coupler 350 may include a directional coupler that splits a signal received on the first pump fiber section 320A to both the second pump fiber section 320B and a terminated optical fiber 340B, and that further splits a reflected signal received on the second pump fiber section 320B to both the first pump fiber section 320A and the reflection fiber 340A. In general, the coupler 350 may split the signal received on the first pump fiber section 320A and the reflected signal received on the second pump fiber section 320B in various proportions. For example, assuming that the coupler 350 has a one percent tap, the coupler 350 may transmit 99 percent of the signal received on the first pump fiber section 320A to the second pump fiber section 320B and the remaining one percent to the terminated fiber 340B, and the coupler 350 may further transmit 99 percent of the reflected signal received on the second pump fiber section 320B to the first pump fiber section 320A and the remaining one percent to the reflection fiber 340A. However, those skilled in the art will appreciate that the coupler 350 may split the signals respectively received on the first pump fiber section 320A and the second pump fiber section 320B using other suitable proportions (e.g., a 100 to 0 zero percent split, a 95 to 5 percent split, etc.).

In one embodiment, when the laser 310 emits a signal, the entire signal may generally enter the coupler 350 via the first pump fiber section 320A. At this time, no signal enters the coupler 350 via the reflection fiber 340A, whereby if the coupler 350 has a one percent tap, the coupler 350 transmits 99 percent of the signal onto the second pump fiber section 320B and the remaining one percent onto the terminated fiber 340B. If any back reflection occurs at the connector 330 (e.g., due to surface contamination or the SBS effect), the entire reflected signal enters the coupler 350 via the second pump fiber section 320B and no signal enters the coupler 350 via the terminated fiber 340B due to a conventional termination at the end thereof. As such, if the coupler 350 has a one percent tap, the coupler 350 may then output 99 percent of the reflected signal back to the laser 310 on the first pump fiber section 320A and the remaining one percent to the detector 360 onto the reflection fiber 340A.

In one embodiment, the detector 360 may include a photodiode (PD) configured to generate an electrical signal in response to the back reflected signal that the coupler 350 transmits from the second pump fiber section 320B onto the reflection fiber 340A. The detector 360 may then feed the electrical signal generated from the back reflected signal to the monitoring circuit 370, which may include a transimpedance amplifier. However, those skilled in the art will appreciate that the monitoring circuit 370 may alternatively comprise a computer, a microprocessor, or other suitable circuitry that can process the electrical signal received from the detector 360. In one embodiment, the electrical signal may comprise a current that the monitoring circuit 370 may measure to determine a reflection coefficient that represents a loss in signal power resulting from the reflected signal (e.g., due to the SBS effect, refractive index discontinuity at a fiber endface or an air-glass interface, etc.). Accordingly, the monitoring circuit 370 may use a variable detection window and a suitable back reflection (BR) threshold to determine whether the reflection coefficients observed within the detection window indicate excessive back reflection that requires shutting down the laser 310 or otherwise triggering maintenance on the laser 310, whether the reflection coefficients observed within the detection window indicate the SBS effect, or whether the reflection coefficients observed within the detection window indicate normal conditions. Furthermore, in one embodiment, the monitoring circuit 370 may determine whether the reflection coefficients observed within the detection window indicate excessive back reflection, the SBS effect, or normal conditions while the laser 310 gradually powers up and during any subsequent steady-state operation, which may allow the monitoring circuit 370 to take appropriate action (e.g., shutting down the laser 310) before the laser 310 emits light at a power level that can cause damage, result in a safety risk, impact system performance, or otherwise interfere with normal operation.

In one embodiment, the BR threshold may generally comprise a suitable value that indicates whether an imperfect connection or other imperfect conditions exist in the fiber optics transmission system (e.g., at the connector 330, which may couple the pump 130 to a Raman amplifier via the second pump fiber section 320B). For example, a "clean" connection or nominal component will typically have minimal back reflection, which may be empirically determined and/or assumed based on a nominal back reflection value that certain connector and component manufacturers may specify, whereas an "unclean" or otherwise imperfect condition will typically cause back reflection beyond the minimal back reflection that typically occurs in a clean connection or nominal component (e.g., due to surface contamination). Furthermore, Raman pump lasers can occasionally experience severe SBS effects at power levels between approximately 50-140 mW. Accordingly, because the monitoring circuit 370 may detect back reflection that indicates imperfect conditions that may require a safety shut down and back reflection that indicates the SBS effect, the BR threshold may comprise a suitable value that may indicate either imperfect conditions or the SBS effect.

In one embodiment, the variable detection window may comprise a suitable time period that may indicate whether any observed back reflection amounts to excessive SBS that may require a safety shut down, whether the SBS effect caused the observed back reflection, or whether the observed back reflection can be considered normal. For example, in a typical Raman amplifier, the SBS effect usually lasts between approximately 20 to 100 microseconds (μs) and usually occurs less frequently at higher pump power levels. More particularly, the SBS effect typically happens when operating pump lasers at low power (i.e., close to the laser threshold) where the pump laser can become spectrally unstable because the pump spectrum may fluctuate rapidly and cause SBS bursts. In this regard, the SBS effect tends to be a side-effect of pump instability during which the laser spectrum can become very narrow and trigger SBS in the transmission fiber (e.g., in cases where the pump interacts with a long fiber length, as in a Raman amplifier). Furthermore, although the SBS effect can last substantially longer than 20 to 100 μs at lower pump power levels, the SBS effect rarely lasts longer than a few milliseconds (ms). Accordingly, because SBS tends to require a combination of a narrow linewidth laser and a long length of optical fiber, the variable detection window may comprise a time period that can vary in a range between approximately 10 μs and 100 ms depending on the power level at which the laser 310 may be operating (e.g., a duration associated with the detection window may initially be in a millisecond range at a low power level and the duration may subsequently decrease to approximately 10 μs as the laser 310 approaches and/or reaches steady-state operation at higher power levels because the SBS effect typically lasts substantially longer at lower power levels). Furthermore, as shown in FIGS. 6A-6B and as will be described in greater detail below, the variable detection window may be synchronized (e.g., to a clock cycle associated with the pump 130 or another suitable component) or unsynchronized (e.g., started in response to the monitoring circuit 370 detecting back reflection that exceeds the BR threshold).

Accordingly, in response to the detector 360 receiving a back reflected signal, the monitoring circuit 370 may calculate a reflection coefficient that represents a ratio between the power level at which the laser 310 may be operating and the power associated with the back reflected signal and then compare the reflection coefficient to the BR threshold. For example, a linear relationship often exists between the power output from the laser 310 and the power associated with the back reflected signal, whereby the reflection coefficient may represent a percentage or portion of the signal that is reflected. In one embodiment, to determine whether the reflection coefficient associated with the back reflection signal indicates excessive back reflection that may warrant a safety shut down, the SBS effect, or normal conditions, the monitoring circuit 370 may analyze the reflection coefficients associated with the back reflections observed within the variable detection window.

For example, if the reflection coefficients associated with the back reflections observed within a particular detection window always exceeded the BR threshold, the monitoring circuit 370 may detect a back reflection issue and take appropriate remedial action to prevent safety risks and/or damage to the fiber optics transmission system (e.g., the monitoring circuit 370 may shut down the laser 310, the pump 130, the Raman amplifier, or other suitable optical components, generate a notification to indicate that the fiber optics transmission system may require maintenance, etc.).

Alternatively, if the reflection coefficients associated with the back reflections observed within the particular detection window had at least one point higher than the BR threshold and at least one point below the BR threshold, the monitoring circuit 370 may attribute the back reflections observed in that window to the SBS effect and record an appropriate event that represents the observed SBS effect. For example, in one embodiment, the monitoring circuit 370 may maintain an SBS counter (e.g., in a storage register or other suitable memory) to track how many SBS events were encountered and associate each SBS event with a time stamp that indicates when the SBS event was observed (e.g., the time when the detection window started or ended, the detection window mid-point, or any other suitable time that falls in the detection window). In one embodiment, the SBS counter and the time stamps that the monitoring circuit 370 associates with the SBS events may then be appropriately analyzed to determine the health associated with the Raman amplifier, analyze how many SBS events typically occur at certain settings (e.g., different frequency depths, modulations, power levels, etc.), or otherwise derive information that may indicate whether and/or how the SBS events may impact performance in the fiber optics transmission system (e.g., based on correlations with gain, power dropping, bit error rate hits, or other performance monitoring metrics).

Otherwise, if the reflection coefficients associated with the back reflections observed within the particular detection window were always below the BR threshold, the monitoring circuit 370 may determine that the fiber optics transmission system has no back reflection or SBS issues and continue to operate the laser 310 normally.

In one embodiment, the monitoring circuit 370 may alternatively calculate maximum, minimum, and average reflection coefficient values associated with the back reflections observed in a particular detection window rather than determining whether the reflection coefficients were always above the BR threshold, always below the BR threshold, or included at least one point above the BR threshold and at least one point below the BR threshold. For example, the monitoring circuit 370 may detect a back reflection issue in the particular detection window if the minimum reflection coefficient value observed therein exceeded the BR threshold or determine that the fiber optics transmission system has no back reflection or SBS issues if the maximum reflection coefficient value observed therein was below the BR threshold. Otherwise, if the minimum reflection coefficient value was below the BR threshold and the maximum reflection coefficient value was above the BR threshold, the monitoring circuit 370 may record an appropriate SBS event in a substantially similar manner to that described in further detail above. Additionally, in one embodiment, the monitoring circuit 370 may associate the recorded SBS event with the maximum, minimum, and average reflection coefficient values that were observed in the detection window.

Figure 4:
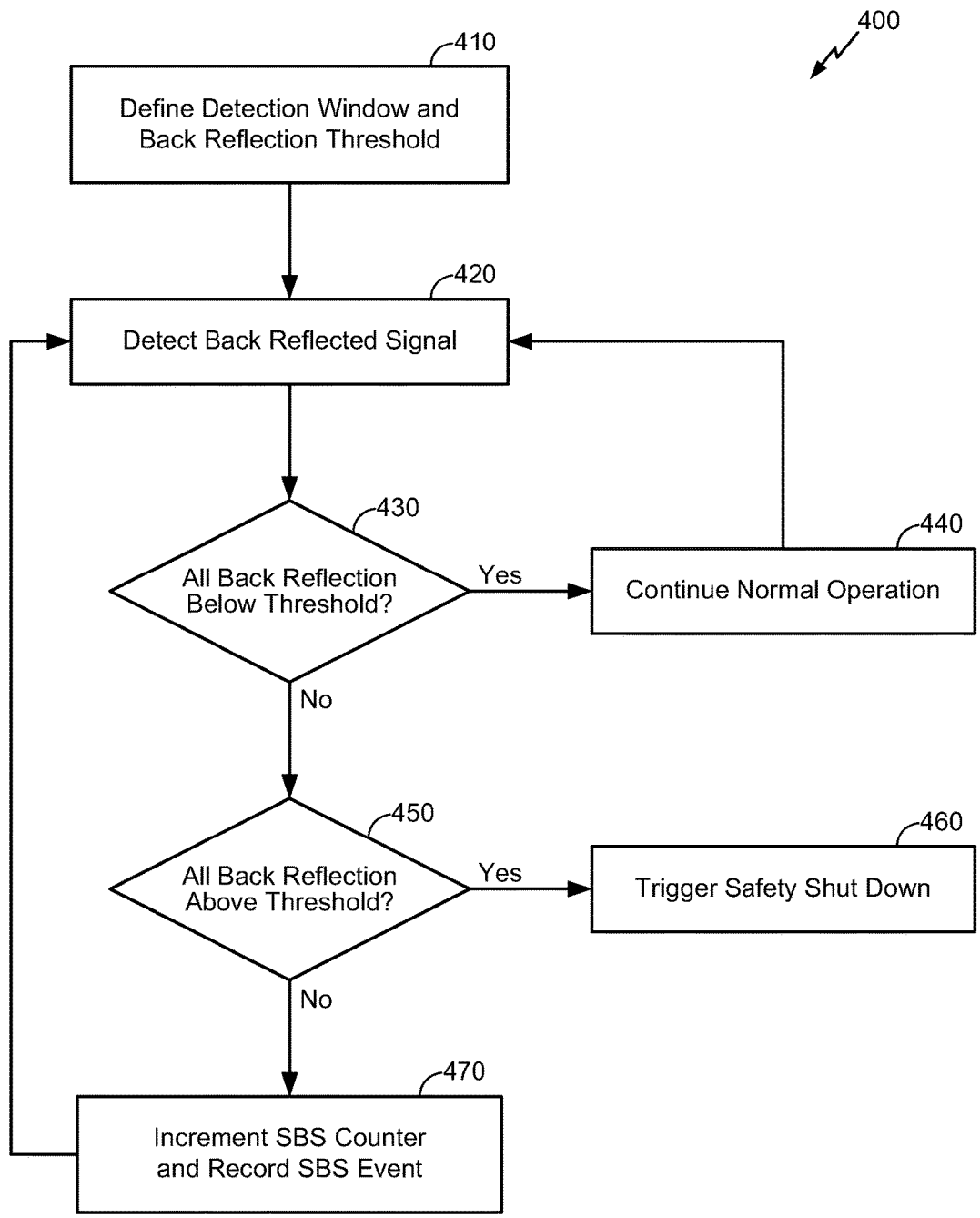
FIGS. 4 and 5 illustrate exemplary methods that may monitor SBS based on a back reflected signal from a Raman amplifier, according to one exemplary embodiment.

According to one exemplary embodiment, FIG. 4 illustrates an exemplary method 400 that a monitoring circuit may perform to monitor simulated Brillouin scattering (SBS) from a Raman amplifier based on reflection coefficients measured from back reflections associated with a beam (e.g., a laser) travelling in a fiber optics transmission system. However, those skilled in the art will appreciate that the monitoring circuit may alternatively comprise a computer, a microprocessor, or other suitable circuitry that can measure the reflection coefficients resulting from the back reflections. In one embodiment, the reflection coefficients that the monitoring circuit measures may generally represent a loss in signal power resulting from the back reflected signal (e.g., due to a back reflection issue that may require shutting down one or more components in the fiber optics transmission system, due to the SBS effect, or due to normal back reflection that occurs in the fiber optics transmission system). In one embodiment, the method 400 may comprise, among other things, defining a variable detection window and a suitable back reflection (BR) threshold at block 410, wherein the variable detection window and the BR threshold may be used to determine whether any reflection coefficients observed within a particular detection window indicate excessive back reflection that requires shutting down or triggering maintenance on a laser, a Raman pump, or other optical components to prevent damage or safety risks, or alternatively to determine whether the observed reflection coefficients indicate normal conditions or that the SBS effect caused the back reflection in the particular detection window.

In one embodiment, the variable detection window defined at block 410 may be defined based on typical conditions that exist in the fiber optics transmission system. For example, in a typical Raman pump, the SBS effect usually lasts approximately 20 to 100 μs and occurs less frequently at high power levels, whereas the SBS effect can last up to a few milliseconds at low power levels. Accordingly, the variable detection window defined at block 410 may comprise a time period between approximately 10 μs and 100 ms, which can be dynamically varied based on the power level at which a laser may be currently operating (e.g., the detection window may be longer when the laser initially powers up and starts to emit a beam at a low power level and appropriately decreased with increases in the power level because the SBS effect tends to last a shorter time at higher power levels). Furthermore, the BR threshold defined at block 410 may comprise any suitable value that can be used to determine whether back reflection indicates imperfect conditions, the SBS effect, or normal conditions that may exist in the fiber optics transmission system.

In one embodiment, in response to suitably defining the variable detection window and the BR threshold, the laser (e.g., the laser 310 shown in FIG. 3) may power up and begin to emit a beam at a low power level. Over time, the laser may eventually ramp up to emit the beam at a high power level (e.g., between approximately 100-500 mW), assuming that the reflection coefficients associated with any back reflections do not trigger a safety shut down. In one embodiment, while in operation, the laser may transmit the beam to a coupler via a pump fiber, wherein the coupler may transmit a first portion of the signal to over the pump fiber and the remaining portion onto a terminated fiber. Furthermore, the signal transmitted via the pump fiber may include back reflection that can be attributed to imperfect or unsafe conditions (e.g., due to fiber ends having surface contaminations or an imperfect mating) or to the SBS effect, or the back reflection may simply represent normal conditions attributable to nominal back reflection that occurs in the fiber optics transmission system. In any case, the monitoring circuit may detect the reflected signal at block 420 and then calculate a reflection coefficient that represents a ratio between the power level at which the laser may be operating and the power associated with the back reflected signal detected at block 420. For example, a linear relationship often exists between the power output from the laser and the power associated with the back reflected signal, whereby the reflection coefficient may represent a portion of the signal that is reflected back.

In one embodiment, the monitoring circuit may then compare the reflection coefficient to the BR threshold at block 430. For example, if the reflection coefficients associated with the back reflections observed within a particular detection window were always below the BR threshold, the monitoring circuit may determine that the fiber optics transmission system has no back reflection or SBS issues and continue normal operation at block 440. The method 400 may then return to block 420 to continue processing the back reflection associated with the signal over time. However, if the reflection coefficients associated with the back reflection observed in the particular detection window were not always below the BR threshold, the monitoring circuit may then determine whether the reflection coefficients observed in the particular detection window indicate a condition that may warrant a safety shut down or the SBS effect. More particularly, the monitoring circuit may determine whether the reflection coefficients observed in the particular detection window always exceeded the BR threshold at block 450 and trigger appropriate remedial action to prevent safety risks and/or damage to the fiber optics transmission system at block 460 if the reflection coefficients observed in the particular detection window always exceeded the BR threshold and therefore indicate a back reflection issue. For example, in one embodiment, the remedial action triggered at block 460 may include shutting down the laser, the Raman pump, the Raman amplifier, or other suitable components in the fiber optics transmission system and/or generating a notification to initiate maintenance on the fiber optics transmission system.

Alternatively, in response to the monitoring circuit determining that the reflection coefficients associated with the back reflections observed within the particular detection window had at least one point higher than the BR threshold and at least one point below the BR threshold, the monitoring circuit may attribute the back reflection observed therein to the SBS effect at block 470. Furthermore, in one embodiment, block 470 may include the monitoring circuit incrementing an SBS counter that tracks how many SBS events were observed, recording an appropriate event that represents the observed SBS effect, and associating the recorded SBS event with a time stamp that indicates when the SBS event was observed. In one embodiment, the SBS counter, the SBS events, and the time stamps associated with the SBS events may then be appropriately analyzed to determine the health associated with the Raman amplifier, to analyze how many SBS events typically occur at certain settings, or otherwise derive information that may indicate whether and/or how the SBS events may impact performance in the fiber optics transmission system. In one embodiment, in response to suitably incrementing the SBS counter and recording the SBS event and the associated time stamp, the method 400 may return to block 420 to continue processing the back reflected signal over time.

Figure 5:
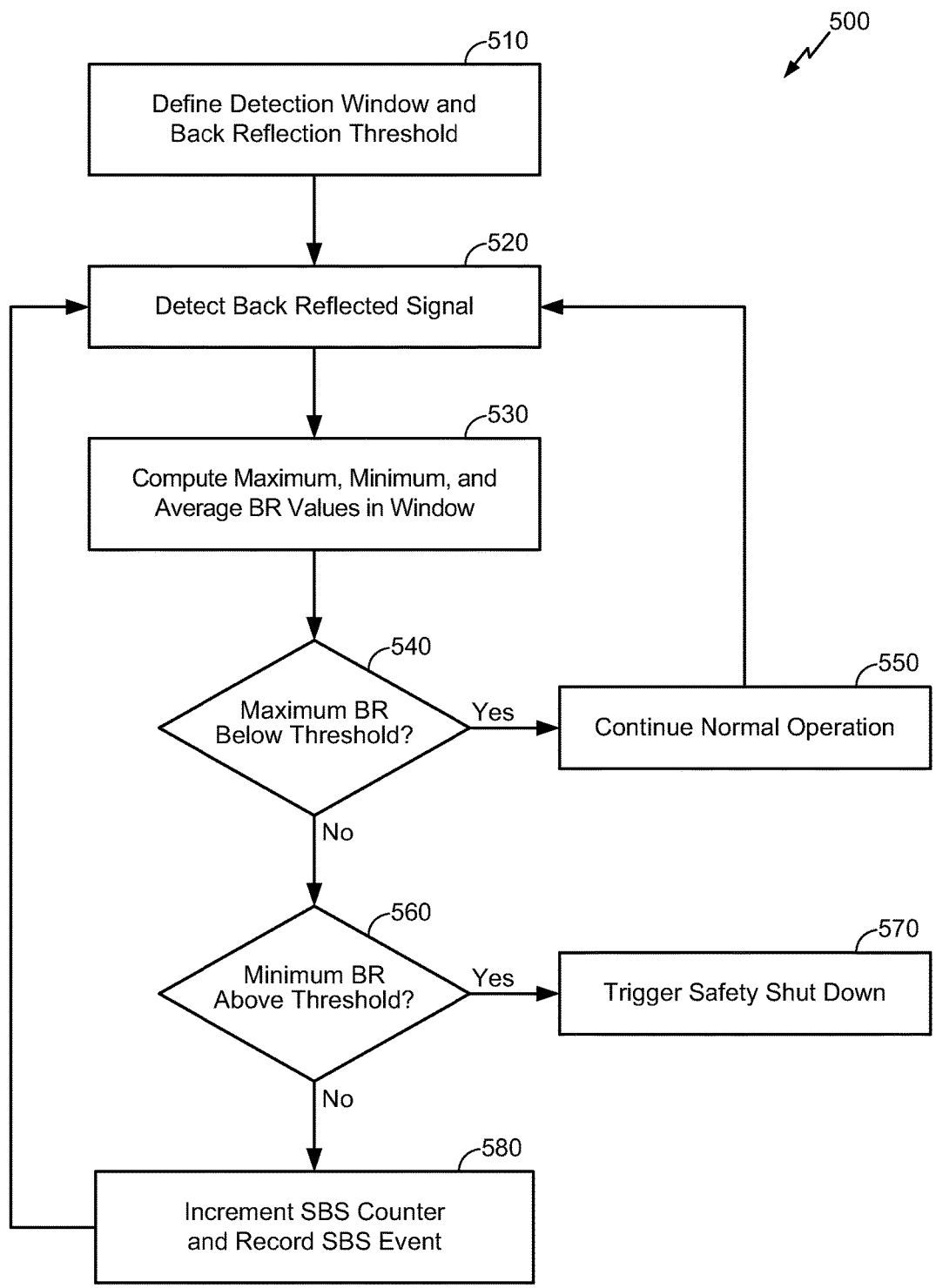

According to another exemplary embodiment, FIG. 5 illustrates alternative method 500 that the monitoring circuit may perform to monitor SBS based on a back reflected signal. In general, the method 500 shown in FIG. 5 may include various function blocks that are substantially similar or identical to function blocks associated with the method 400 shown in FIG. 4 and described in further detail above, except that the method 500 may alternatively configure the monitoring circuit to calculate maximum, minimum, and average reflection coefficient values associated with the back reflections observed in a particular detection window rather than determining whether the reflection coefficients were always above the BR threshold, always below the BR threshold, or had at least one point above the BR threshold and at least one point below the BR threshold. As such, to maintain brevity and simplify the following description, various details relating to certain components or functionalities in the method 500 shown in FIG. 5 may be omitted to the extent that the same or substantially similar details have been provided above in relation to the method 400 shown FIG. 4.

For example, the monitoring circuit may detect a back reflected signal within a particular detection window at block 520 and subsequently compute the maximum, minimum, and average reflection coefficient values associated with the back reflected signal within the particular detection window at block 530. The monitoring circuit may then determine whether the maximum reflection coefficient observed within the detection window was below the BR threshold, in which case the monitoring circuit may determine that the fiber optics transmission system has no back reflection or SBS issues and continue normal operation at block 550. The method 500 may then similarly return to block 520 to continue processing the back reflection associated with the signal over time. However, if the maximum reflection coefficient observed in the detection window was above the BR threshold, the monitoring circuit may then determine whether the minimum reflection coefficient observed in the detection window exceeded the BR threshold at block 560. Accordingly, in response to determining that the minimum reflection coefficient observed in the detection window exceeded the BR threshold, the monitoring circuit may trigger the safety shut down and/or other appropriate remedial action to prevent safety risks or damage to the fiber optics transmission system at block 570.

Otherwise, in response to determining that the maximum reflection coefficient observed in the detection window exceeded the BR threshold and that the minimum reflection coefficient was below the BR threshold, the monitoring circuit may attribute the back reflection observed therein to the SBS effect at block 580. Furthermore, in one embodiment, the monitoring circuit may similarly increment the SBS counter that tracks how many SBS events were observed, record an appropriate event that represents the observed SBS effect, and associate the recorded SBS event with a time stamp that indicates when the SBS event was observed at block 580. Additionally, in one embodiment, the monitoring circuit may associate the recorded SBS event with the maximum, minimum, and average reflection coefficient values that were observed in the detection window at block 580 prior to returning to block 520 to continue processing the back reflected signal over time.

According to one exemplary embodiment, FIG. 6A and FIG. 6B respectively illustrate exemplary clock-synchronized and unsynchronized timing diagrams that show possible SBS events, back reflection issues, and normal conditions detected based on back reflection from a monitored Raman amplifier. For example, referring to FIG. 6A, the monitoring circuit described in further detail above may generally observe a back reflected signal 610 over time, which may progress in a direction represented via arrow 650. As shown in FIG. 6A, the monitoring circuit may detect possible SBS events, back reflection issues, and normal conditions within a variable detection window that may be synchronized to an appropriate clock (e.g., to a clock cycle associated with the Raman pump or another suitable component in the fiber optic transmission system). Further, the monitoring circuit may define a normal BR value 630 that represents the nominal back reflection that can be expected during normal operation and a BR threshold value 620 that represents possible SBS events and/or back reflection issues.

Accordingly, in one embodiment, the monitoring circuit may generally observe the reflection coefficients associated with the back reflected signal 610 within each variable detection window and appropriately attribute the observed reflection coefficients to the normal conditions, the SBS effect, or back reflection issues. More particularly, as shown in FIG. 6A, any variable detection windows in which the back reflected signal 610 always remained below the threshold value 620 (or had a maximum reflection coefficient below the threshold value 620) may be attributed to normal conditions, while any variable detection windows in which the back reflected signal 610 always remained above the threshold value 620 (or had a minimum reflection coefficient that exceeded the threshold value 620) may be attributed to back reflection issue that requires a safety shut down. As such, any other variable detection windows may be attributed to the SBS effect (e.g., detection windows during which the back reflected signal 610 included at least one point above the threshold value 620 and at least one point below the threshold value 620, or during which the back reflection signal 610 had a maximum reflection coefficient that exceeded the threshold value 620 and a minimum reflection coefficient that did not exceed the threshold value 620). Accordingly, the only instances in which the monitoring circuit may trigger a safety shut down may occur when the back reflected signal 610 remained above the threshold value 620 during an entire detection window or had a minimum reflection coefficient during a certain detection window that exceeded the threshold value 620 (e.g., detection windows 640).

Referring now to FIG. 6B, the monitoring circuit may similarly observe the back reflected signal 610 over time in a direction represented via arrow 650. However, the timing diagram shown in FIG. 6B may be unsynchronized, in that any particular detection window may generally start in response to the monitoring circuit detecting that the back reflected signal 610 exceeds the threshold value 620. Accordingly, in response the monitoring circuit detecting that the reflection coefficient associated with the back reflected signal 610 exceeded the threshold value 620, the monitoring circuit may appropriately start the detection window and subsequently attribute the observed reflection coefficient that exceeded the threshold value 620 to the SBS effect or back reflection issues. For example, as shown in FIG. 6B, the monitoring circuit may determine whether the back reflected signal 610 includes at least one point above the threshold value 620 and at least one point below the threshold value 620 when the detection window that was started in response to the back reflected signal 610 exceeding the threshold value 620 subsequently ends, wherein the reflection coefficients within the completed detection window may be attributed to the SBS effect if the back reflected signal 610 includes at least one point above and at least one point below the threshold value 620 within the completed detection window. Otherwise, if the back reflected signal 610 remained above the threshold value 620 during the entire detection window (e.g., detection windows 640), the monitoring circuit may trigger a safety shut down.

Furthermore, when the monitoring circuit observes the back reflected signal 610 in accordance with the unsynchronized timing diagram shown in FIG. 6B, wherein the monitoring circuit only starts a particular detection window in response to detecting that the back reflected signal 610 exceeds the threshold value 620, any time periods during which the detection window may not be running may indicate normal conditions. In particular, a time period during which the monitoring circuit does not run the detection window may indicate normal conditions because the back reflected signal 610 remains within the range between the normal BR value 630 and the BR threshold value 620 during the entire time period. Accordingly, referring back to FIGS. 4 and 5, certain function blocks illustrated therein and described above may be suitably modified and/or omitted when the monitoring circuit observes the back reflected signal 610 in accordance with the unsynchronized timing diagram shown in FIG. 6B. For example, in embodiments that relate to unsynchronized monitoring, blocks 420 and 520 in FIGS. 4 and 5 may be modified to detect the back reflected signal in response to the reflection coefficient associated therewith exceeding the relevant threshold (e.g., any back reflected signals that have a reflection coefficient below the threshold may be ignored or otherwise discarded). As such, the monitoring circuit may generally start a current detection window in response to detecting a back reflected signal having a reflection coefficient that exceeds the threshold at blocks 420 and 520, and the monitoring circuit may then simply determine whether the back reflected signal that exceeded the threshold requires a safety shut down (e.g., if block 450 results in a determination that the back reflected signal remained above the threshold during the entire detection window or block 560 results in a determination that the minimum reflection coefficient associated with the back reflected signal during the detection window exceeded the threshold). Otherwise, the monitoring circuit may attribute the back reflected signal that exceeded the threshold to the SBS effect.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To clearly illustrate this interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action, The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments that may be used in an embedded apparatus that can monitor SBS from a Raman amplifier in a fiber optics transmission system, those skilled in the art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

What is claimed is:

1. An apparatus to monitor pump stability in a fiber optics transmission system, comprising:
    an optical pump source configured to transmit a signal in the fiber optics transmission system;
    an optical amplifier configured to receive the signal and to amplify the signal based thereon; and
    a monitoring circuit configured to compare reflection coefficients associated with one or more back reflections from the fiber optics transmission system during a detection window to a threshold to determine whether the one or more back reflections during the detection window indicate a stimulated Brillouin scattering (SBS) event undesirably caused by the optical pump source, a normal condition, or excessive back reflections that trigger at least one remedial action, wherein the detection window is a time period that is a value between 10 µs and 100 ms,
    wherein the SBS event is detected based on the one or more reflection coefficients being above the threshold during less than all of the detection window, and the excessive back reflections are detected based on the one or more reflection coefficients being above the threshold during all of the detection window.

2. The apparatus recited in claim 1, wherein the monitoring circuit is configured to determine that the one or more back reflections during the detection window indicate the SBS event in response to the reflection coefficients associated therewith including at least one value above the threshold and at least one value below the threshold.

3. The apparatus recited in claim 1, wherein the monitoring circuit is configured to determine that the one or more back reflections during the detection window indicate the SBS event in response to the reflection coefficients associated therewith having a maximum value above the threshold and a minimum value below the threshold.

4. The apparatus recited in claim 1, wherein the monitoring circuit is configured to determine that the one or more back reflections during the detection window indicate the normal condition in response to the reflection coefficients associated therewith remaining below the threshold during the entire detection window.

5. The apparatus recited in claim 1, wherein the monitoring circuit is configured to determine that the one or more back reflections during the detection window indicate the normal condition in response to the reflection coefficients associated therewith having a maximum value below the threshold.

6. The apparatus recited in claim 1, wherein the monitoring circuit is configured to determine that the one or more back reflections during the detection window indicate the excessive back reflections in response to the reflection coefficients associated therewith exceeding the threshold during the entire detection window.

7. The apparatus recited in claim 1, wherein the monitoring circuit is configured to determine that the one or more back reflections during the detection window indicate the excessive back reflections in response to the reflection coefficients associated therewith having a minimum value above the threshold.

8. The apparatus recited in claim 1, wherein the monitoring circuit is further configured to:
increment an SBS counter that tracks how many SBS events have been observed in the fiber optics transmission system in response to the one or more back reflections during the detection window indicating the SBS event; and
record a time stamp associated with the indicated SBS event, wherein the SBS counter and the recorded time stamp associated with the SBS event can be stored and correlated with one or more metrics that indicate health or performance associated with at least one component in the fiber optics transmission system.

9. The apparatus recited in claim 1, wherein the detection window has a variable duration that decreases in response to increases in a power level at which the optical pump source transmits the signal.

10. The apparatus recited in claim 1, wherein the monitoring circuit is further configured to synchronize the detection window to a clock or start the detection window in response to detecting at least one back reflection having a reflection coefficient above the threshold.

11. A method to monitor pump stability in a fiber optics transmission system, comprising:
operating an optical pump source to transmit a signal in the fiber optics transmission system, wherein an optical amplifier receives the signal and amplifies based thereon;
measuring, at a monitoring circuit, reflection coefficients associated with one or more back reflections from the fiber optics transmission system during a detection window; and
comparing, at the monitoring circuit, the measured reflection coefficients associated with the one or more back reflections during the detection window to a threshold to determine whether the one or more back reflections during the detection window indicate a stimulated Brillouin scattering (SBS) event undesirably caused by the optical pump source, a normal condition, or excessive back reflections that trigger at least one remedial action, wherein the detection window is a time period that is a value between 10 µs and 100 ms,
wherein the SBS event is detected based on the one or more reflection coefficients being above the threshold during less than all of the detection window, and the excessive back reflections are detected based on the one or more reflection coefficients being above the threshold during all of the detection window.

12. The method recited in claim 11, wherein comparing the measured reflection coefficients to the threshold comprises:
determining that the one or more back reflections during the detection window indicate the SBS event in response to one or more of the measured reflection coefficients in the detection window including at least one value above the threshold and at least one value below the threshold or the reflection coefficients measured therein having a maximum value above the threshold and a minimum value below the threshold.

13. The method recited in claim 12, further comprising:
incrementing an SBS counter that tracks how many SBS events have been observed in the fiber optics transmission system in response to determining that the one or more back reflections during the detection window indicate the SBS event; and
recording a time stamp associated with the indicated SBS event, wherein the SBS counter and the recorded time stamp associated with the SBS event can be stored and correlated with one or more metrics that indicate health or performance associated with at least one component in the fiber optics transmission system.

14. The method recited in claim 11, wherein comparing the measured reflection coefficients to the threshold comprises:
determining that the one or more back reflections during the detection window indicate the normal condition in response to one or more of the measured reflection coefficients in the detection window remaining below the threshold during the entire detection window or the reflection coefficients measured therein having a maximum value below the threshold.

15. The method recited in claim 11, wherein comparing the measured reflection coefficients to the threshold comprises:
determining that the one or more back reflections during the detection window indicate the excessive back reflections in response to one or more of the measured reflection coefficients in the detection window exceeding the threshold during the entire detection window or the reflection coefficients measured therein having a minimum value above the threshold.

16. A non-transitory computer-readable storage medium having computer-executable instructions to monitor pump stability in a fiber optics transmission system recorded thereon, wherein executing the computer-executable instructions on a device causes the device to:
operate an optical pump source to transmit a signal to an optical amplifier in the fiber optics transmission system, wherein the optical amplifier receives the signal and amplifies based thereon;
measure reflection coefficients associated with one or more back reflections from the fiber optics transmission system during a detection window; and
compare the measured reflection coefficients associated with the one or more back reflections during the detection window to a threshold to determine whether the one or more back reflections during the detection window indicate a stimulated Brillouin scattering (SBS) event undesirably caused by the optical pump source, a normal condition, or excessive back reflections that trigger at least one remedial action, wherein the detection window is a time period that is a value between 10 µs and 100 ms,
wherein the SBS event is detected based on the one or more reflection coefficients being above the threshold during less than all of the detection window, and the excessive back reflections are detected based on the one or more reflection coefficients being above the threshold during all of the detection window.

17. The non-transitory computer-readable storage medium recited in claim 16, wherein executing the computer-executable instructions on the device further causes the device to:
determine that the one or more back reflections during the detection window indicate the SBS event in response to one or more of the measured reflection coefficients in the detection window including at least one value above the threshold and at least one value below the threshold or the reflection coefficients measured therein having a maximum value above the threshold and a minimum value below the threshold.

18. The non-transitory computer-readable storage medium recited in claim 17, wherein executing the computer-executable instructions on the device further causes the device to:
- increment an SBS counter that tracks how many SBS events have been observed in the fiber optics transmission system in response to determining that the one or more back reflections during the detection window indicate the SBS event; and
- record a time stamp associated with the indicated SBS event, wherein the SBS counter and the recorded time stamp associated with the SBS event can be stored and correlated with one or more metrics that indicate health or performance associated with at least one component in the fiber optics transmission system.

19. The non-transitory computer-readable storage medium recited in claim 16, wherein executing the computer-executable instructions on the device further causes the device to:
- determine that the one or more back reflections during the detection window indicate the normal condition in response to one or more of the measured reflection coefficients in the detection window remaining below the threshold during the entire detection window or the reflection coefficients measured therein having a maximum value below the threshold.

20. The non-transitory computer-readable storage medium recited in claim 16, wherein executing the computer-executable instructions on the device further causes the device to:
- determine that the one or more back reflections during the detection window indicate the excessive back reflections in response to one or more of the measured reflection coefficients in the detection window exceeding the threshold during the entire detection window or the reflection coefficients measured therein having a minimum value above the threshold.

* * * * *